US009691221B2

(12) United States Patent
Block et al.

(10) Patent No.: US 9,691,221 B2
(45) Date of Patent: Jun. 27, 2017

(54) GAMING SOCIAL COMMUNICATION

(71) Applicant: WMS Gaming, Inc., Waukegan, IL (US)

(72) Inventors: Rory L. Block, Washoe Valley, NV (US); Jacob C. Greenberg, Elgin, IL (US); Vernon W. Hamlin, Lisle, IL (US); Laurie E. Lasseter, Woodridge, IL (US); Craig J. Sylla, Round Lake, IL (US); Mark K. Trego, Chicago, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 283 days.

(21) Appl. No.: 14/259,957

(22) Filed: Apr. 23, 2014

(65) Prior Publication Data

US 2014/0235332 A1    Aug. 21, 2014

Related U.S. Application Data

(63) Continuation of application No. 12/934,538, filed as application No. PCT/US2009/037919 on Mar. 23, 2009, now Pat. No. 8,758,102.

(Continued)

(51) Int. Cl.
| G07F 17/32 | (2006.01) |
| G06Q 30/02 | (2012.01) |
| G06Q 50/34 | (2012.01) |

(52) U.S. Cl.
CPC ......... G07F 17/3239 (2013.01); G06Q 30/02 (2013.01); G06Q 50/34 (2013.01); G07F 17/32 (2013.01); G07F 17/3232 (2013.01)

(58) Field of Classification Search
CPC .................................................. G07F 17/3239
See application file for complete search history.

(56) References Cited

U.S. PATENT DOCUMENTS

| 6,843,725 B2 | 1/2005 | Nelson |
| 6,935,958 B2 | 8/2005 | Nelson |

(Continued)

FOREIGN PATENT DOCUMENTS

| WO | WO-2008030928 | 3/2008 |
| WO | WO-2009120616 | 10/2009 |

OTHER PUBLICATIONS

S. Björk et al., "Pirates! Using the Physical World as a Game Board," Proc. Conf. Human-Computer Interaction (Interact 01), IOS Press, Amsterdam, 2001, pp. 9-13—which was printed from URL <http://www.cc.gatech.edu/~keith/classes/ubicomplexity/pdfs/apps/bjoerk-pirates.pdf>, 8 pages.*

(Continued)

Primary Examiner — Jason Skaarup
(74) Attorney, Agent, or Firm — DeLizio Law, PLLC

(57) ABSTRACT

Disclosed herein are one or more examples of generating a communication directed to a contact of a wagering game player account. In some embodiments, a gaming system can perform operations to determine an identity of an individual located within a given physical location and present, on a display device, a virtual identifier associated with the contact. The individual is indicated as a contact in a wagering game player account. The display device is associated with the wagering game player account. The gaming system can further perform an operation to detect a user input related to the virtual identifier presented on the display device. Further, the gaming system can perform an operation to send a communication to a device associated with the contact in response to detecting the user input.

19 Claims, 10 Drawing Sheets

Related U.S. Application Data

(60) Provisional application No. 61/092,525, filed on Aug. 28, 2008, provisional application No. 61/039,199, filed on Mar. 25, 2008.

(56) References Cited

U.S. PATENT DOCUMENTS

| | | | |
|---|---|---|---|
| 6,972,757 B2 | 12/2005 | Arikawa | |
| 7,288,028 B2 | 10/2007 | Rodriquez et al. | |
| 7,300,352 B2 | 11/2007 | Rowe | |
| 7,753,789 B2 | 7/2010 | Walker et al. | |
| 8,073,657 B2 | 12/2011 | Moore, III et al. | |
| 8,130,219 B2 | 3/2012 | Fleury et al. | |
| 8,172,684 B2 | 5/2012 | Adiraju et al. | |
| 8,531,483 B1 | 9/2013 | Schileru | |
| 8,574,072 B2 | 11/2013 | Motyl et al. | |
| 9,161,157 B2* | 10/2015 | Evans | H04W 4/005 |
| 9,486,704 B2* | 11/2016 | Nguyen | G07F 17/3225 |
| 9,595,161 B2* | 3/2017 | Nguyen | G07F 17/3253 |
| 2005/0012818 A1* | 1/2005 | Kiely | G07F 19/20 348/143 |
| 2005/0255911 A1 | 11/2005 | Nguyen et al. | |
| 2006/0020904 A1 | 1/2006 | Aaltonen et al. | |
| 2006/0178215 A1 | 8/2006 | Lehikoinen et al. | |
| 2006/0252530 A1 | 11/2006 | Oberberger et al. | |
| 2006/0287098 A1 | 12/2006 | Morrow et al. | |
| 2007/0077995 A1 | 4/2007 | Oak et al. | |
| 2007/0087834 A1 | 4/2007 | Moser et al. | |
| 2007/0099697 A1 | 5/2007 | Nelson | |
| 2007/0111799 A1 | 5/2007 | Robb et al. | |
| 2007/0182818 A1 | 8/2007 | Buehler | |
| 2008/0070652 A1 | 3/2008 | Nguyen et al. | |
| 2008/0138773 A1 | 6/2008 | Lathrop | |
| 2008/0261699 A1 | 10/2008 | Topham et al. | |
| 2008/0263088 A1 | 10/2008 | Webster et al. | |
| 2008/0318655 A1* | 12/2008 | Davies | G07F 17/32 463/16 |
| 2009/0055204 A1 | 2/2009 | Pennington et al. | |
| 2009/0055205 A1 | 2/2009 | Nguyen et al. | |
| 2009/0131144 A1 | 5/2009 | Allen | |
| 2009/0264190 A1 | 10/2009 | Davis et al. | |
| 2009/0265105 A1 | 10/2009 | Davis et al. | |
| 2010/0035682 A1 | 2/2010 | Gentile et al. | |
| 2010/0113161 A1 | 5/2010 | Walker et al. | |
| 2010/0203963 A1* | 8/2010 | Allen et al. | 463/30 |
| 2011/0045908 A1* | 2/2011 | Ehrlich | G07F 17/32 463/42 |
| 2011/0183732 A1 | 7/2011 | Block et al. | |
| 2011/0294575 A1 | 12/2011 | Morrow et al. | |
| 2012/0190421 A1 | 7/2012 | Ruppert et al. | |

OTHER PUBLICATIONS

"PCT Application No. PCT/US09/37919 International Preliminary Report on Patentability", Jun. 18, 2010, 18 pages.

"PCT Application No. PCT/US09/37919 International Search Report", Jul. 22, 2009, 11 pages.

\* cited by examiner

GAMING SOCIAL COMMUNICATION

RELATED APPLICATIONS

This application is a continuation application of, and claims priority benefit of, U.S. application Ser. No. 12/934,538 which is a National Stage Application of PCT/US09/37919 filed Mar. 23, 2009, which claims the priority benefit of U.S. Provisional Application Ser. No. 61/039,199 filed Mar. 25, 2008 and U.S. Provisional Application Ser. No. 61/092,525 filed Aug. 28, 2008. The Ser. No. 12/934,538 Application, the PCT/US09/37919 Application, the 61/039,199 Application and the 61/092,525 Application are incorporated herein by reference.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2014, WMS Gaming, Inc.

TECHNICAL FIELD

Embodiments of the inventive subject matter relate generally to casino monitoring systems, and more particularly to devices and processes that generate casino floor maps.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a method comprises analyzing video footage of one or more casino floor objects, wherein the video footage includes any one or more of live video data and recorded video data; determining metadata related to any of the casino floor objects; generating an overlay object for each of the casino floor objects for which metadata is available; creating a video casino floor map by superimposing the overlay objects over the video footage of the casino floor objects; detecting a selection of one of the overlay objects on the video casino floor map; and presenting metadata for a casino floor object associated with the selected overlay object.

In some embodiments, determining metadata related to any of the casino floor objects includes collecting metadata related to one or more of the identity of the casino floor objects, operational status of the casino floor objects, history of the casino floor objects, and characteristics of the casino floor objects.

In some embodiments, generating an overlay object comprises creating a dynamic, selectable image that highlights a casino object for which metadata is available.

In some embodiments, superimposing the overlay objects over the video footage includes: generating a computerized grid scaled to a casino floor layout; determining locations of the casino floor objects on the casino floor; placing, for the casino objects, object location identifiers on the computerized grid, wherein the object locations identifiers correlate with the locations of the casino objects on the casino floor; associating the video footage with the computerized grid so that video images of the casino floor objects coincide with the object location identifiers on the computerized grid; and positioning the overlay objects to coincide with the object location identifiers corresponding to casino floor objects for which metadata is available.

In some embodiments, presenting metadata for the selected overlay object comprises displaying the metadata in a pop-up image on the video casino floor map, wherein the pop-up image is connected to the single overlay object.

In some embodiments, one or more machine-readable media having instructions stored thereon, which when executed by a set of one or more processors causes the set of one or more processors to perform operations that comprises capturing an image of a casino floor object; determining a location of the casino floor object in relation to a casino floor landscape surrounding the casino floor object; generating a virtual object depicting the casino floor object; generating a virtual casino floor landscape representing the casino floor landscape; positioning the virtual object in the virtual casino floor landscape approximating the location of the casino floor object on the casino floor landscape, resulting in a virtual casino floor layout map; and presenting the virtual casino floor layout map.

In some embodiments, generating a virtual object depicting the casino floor object includes: determining, from the image, an object shape and one or more visible characteristics of the casino floor object; generating a geometric virtual skeleton, shaped like the object shape; generating one or more virtual textures having a similar appearance to the one or more visible characteristics; and applying the one or more virtual textures onto the geometric virtual skeleton.

In some embodiments, generating a virtual object depicting the casino floor object comprises utilizing a stored image referenced by a player account setting, wherein the stored image represents an identifier of a social contact associated with the player account.

In some embodiments, the machine-readable media further comprises recording a plurality of additional images of the casino floor object over a continuous period of time to a capture activities performed by the casino object; and animating the virtual object based on the activities performed by the casino floor object.

In some embodiments, the machine-readable media further comprises determining metadata related to any one or more of the identity, operational status, history, and characteristics of the casino floor object; generating an overlay object related to the casino floor object for which the metadata is available; positioning the overlay object in the virtual casino floor map in connection with the virtual object; detecting a selection of the overlay object on the virtual casino floor map; and presenting the metadata in connection with the virtual object.

In some embodiments, generating the overlay object comprises creating a dynamic, selectable image that highlights the virtual object.

In some embodiments, presenting metadata for the casino floor object comprises displaying the metadata in a pop-up image on the virtual casino floor map, wherein the pop-up image is connected to the overlay object.

In some embodiments, a system, comprises a casino floor monitoring device includes, a detection unit configured to record perceptible characteristics possessed by casino floor objects; and a communication unit configured to broadcast any one or more of live video and recorded video of the perceptible characteristics; a monitoring server includes, a floor monitoring unit configured to receive the recording from the floor monitoring device, a floor layout manager configured to generate a computerized casino floor layout, and overlay recorded casino objects on the computerized casino floor layout, and a monitoring processor configured to superimpose overlay objects onto the computerized casino floor layout that convey metadata about the casino floor objects.

In some embodiments, the monitoring processor is configured to generate one or more hotspot images that highlight recorded casino objects for which metadata is available, and superimpose the one or more hotspots on the computerized casino floor layout over the recorded casino objects for which the metadata is available.

In some embodiments, the monitoring processor is configured to generate virtual objects that are similar in shape and appearance to the recorded casino objects, and control the rendering, texturing, positioning, actions, and appearances of the virtual objects on the computerized casino floor layout.

In some embodiments, the system further comprises an identification unit configured to collect or calculate metadata, wherein the metadata is related to any one or more of the identity, operational status, history, and characteristics of the casino floor objects.

In some embodiments, the system further comprises an account server configured to control a player account with player preferences regarding how the computerized casino floor layout is presented: a wagering game server configured to access the player preferences from the account server and convey the player preferences to any one of the monitoring server and a mobile wagering game machine, and the mobile wagering game machine configured to present the casino floor maps according to the player preferences.

In some embodiments, an apparatus, comprises a casino floor monitoring unit configured to receive a captured image of casino objects on a casino floor; and a monitoring processor configured to generate a computerized image of a casino floor layout, generate computerized objects similar in appearance to the casino objects, and animate the computerized objects based on activities performed by the casino objects.

In some embodiments, the monitoring processor is configured to generate overlay objects indicating metadata available about the casino objects, and superimpose the overlay objects onto the computerized image of the casino floor layout.

In some embodiments, the monitoring processor is further configured to present any one or more of money transactions on a casino floor, a need for security assistance, potential mischievous behavior, special casino guests, jack-pot winners, security hazards, staffing needs, malfunctioning machines, casino traffic-patterns, player history, social contacts, avatars belonging to social contacts, chat boxes, search boxes, available wagering game machines, openings in a wagering game, invitations to a wagering game, available casino staff, and detailed imagery of casino patrons.

In some embodiments, the apparatus further comprises a device configured to present the computerized image of a casino floor layout and the computerized objects, wherein the device comprises any one or more of a kiosk, a mobile wagering game machine, a cell phone, a computer monitor, and a touch-screen sensitive monitor capable of responding to finger stroke patterns.

In some embodiments, a casino monitoring computer device, comprises means for monitoring visible characteristics possessed by, and signals generated by, physical objects on a casino floor, resulting in captured data; means for processing the captured data to generate calculated data regarding activities performed by, or qualities exhibited by, the physical objects; means for obtaining collected data pertaining to any one or more of the identity, operational status, and historical activity of the physical objects; and means for generating a single multimedia presentation comprising the captured data, the calculated data, and the collected data.

In some embodiments, the captured data comprises any one or more of facial characteristics, clothing characteristics, wagering game behavior, financial transactions, sounds, heat, luminosity, radio signals, live video data, and recorded video data.

In some embodiments, the casino monitoring computer device further comprises means for recording the single multimedia presentation, and means for presenting any portion of the single multimedia presentation for a specific time period in the past.

In some embodiments, the casino monitoring computer device further comprises means for automatically reacting to information presented in the single multimedia presentation comprising any one or more of signaling a casino staff member of a potential problem in the casino, controlling casino floor lighting based on captured populations of casino patrons, controlling back-lighting on wagering game machines based on captured wagering game activity, signaling when a casino patron has hit a jackpot, signaling unusual or potentially criminal activity by patrons or casino staff, and signaling security personnel of potential hazards.

In some embodiments, a method comprises determining one or more biometric identifiers of a person in a casino; comparing the one or more biometric identifiers to stored identifying information; identifying the person based on the stored identifying information; and presenting an electronic valet on a casino display device to assist the person within the casino.

In some embodiments, the electronic valet is a character in a long-standing bonus game.

In some embodiments, the electronic valet is an avatar stored in a player account.

In some embodiments, the one or more biometric identifiers include one or more of a picture of a person on an identification card, a person's facial features, a fingerprint, a radio frequency identifier, a gait, an eye color, a hair color, a retinal image, and a voice pattern.

In some embodiments, presenting an electronic valet further includes receiving a request from the person to show private information, requesting an additional biometric identifier, detecting the additional biometric identifier, verifying the validity of the additional biometric identifier, and presenting the private information on the casino display device.

In some embodiments, the method further comprises recognizing facial expressions made by the person; detecting the person's mood based on the facial expressions; and providing assistance, via the electronic valet, based on the detected mood.

In some embodiments, an wagering game machine, comprises a biometric scanning device configured to take up-close reference measurements of one or more unique biometric characteristics of a person on a casino floor; and a casino monitoring module configured to record the reference measurements, compare the reference measurements to one or more stored records containing pre-stored biometric measurements, identify the person from the one or more stored records, and personalize functionality of the wagering game machine based on the person's identity.

In some embodiments, the casino monitoring module is further configured to scan a picture of the person, and determine the location of the person on a casino floor.

In some embodiments, the casino monitoring module is further configured to receive a command from the person, refer to a casino user account for the person, determine that the casino user account has rights to perform the command, and perform the command.

In some embodiments, the casino monitoring module is further configured to detect a language of a person's voice, and cause wagering game options to appear in the detected language.

In some embodiments, the casino monitoring module is further configured to detect an avatar character associated with an account for the person, and present an interactive animation of the avatar character on the wagering game machine.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into six sections. The first section provides an introduction to embodiments. The second section describes example operating environments while the third section describes example operations performed by some embodiments. The fourth section describes additional example embodiments while the fifth section describes additional example operating environments. The sixth section presents some general comments.

Introduction

This section provides an introduction to some embodiments.

Figure 1:
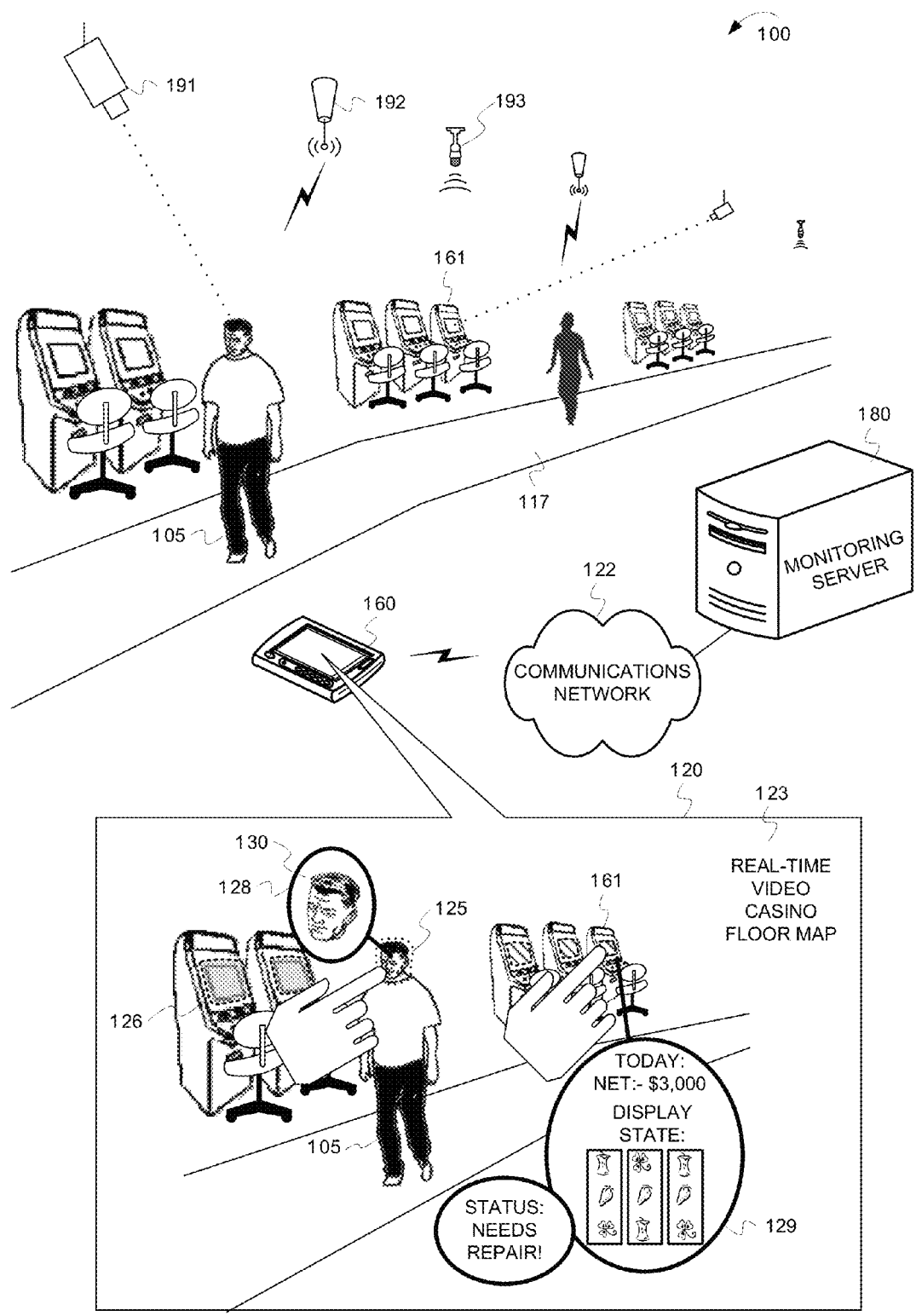
FIG. 1 is an illustration of generating a real-time video casino floor map 123, according to some embodiments.

Casino technicians, security, and other staff, are regularly concerned with monitoring potential problems within a casino. Some casinos have security monitoring systems in place that record video images of a casino floor and present the video on a television or computer monitor. However, the security monitoring systems are limited in their abilities, and casino staff must rely on a host of other monitoring equipment and manual inspection procedures to track casino activity and potential problems. Further, some casino patrons may want to see the casino, or portions of the casino, in a way that will assist and orient the casino patron while on the casino floor. FIG. 1 shows how a casino monitoring system, according to some embodiments, that can visually, and dynamically, present information about items, people, machines, etc., to a casino staff member or a casino patron, in conjunction with recorded audio, video, and other data from a casino premises.

FIG. 1 is a conceptual diagram that illustrates an example of generating a real-time video casino floor map, according to some embodiments. In FIG. 1, a casino monitoring system 100 includes one or more monitoring devices that capture activities and/or conditions of a casino floor, including, but not limited to patron or staff activities and characteristics, machine states, lighting problems, traffic patterns, jackpot wins, group activities, location of friends and family, unsafe or unsecure conditions, available game machines, etc. The devices can include one or more video cameras 191, one or more radio signal detectors 192, one or more microphones 193, and other devices not shown, such as still-shot cameras, motion sensors, heat sensors, weight sensors, locator devices (e.g., radio identification tags or cards, global positioning satellite devices, etc.) and other types of monitoring devices. Example devices are illustrated, such as the one or more video cameras 191 to capture images and movements, one or more radio signal detectors 192 to detect wirelessly transmittable signals (e.g., RFID signals), and one or more microphone 193 to detect sound waves. For example, the monitoring devices can capture video and sound of casino floor "objects" (e.g., patrons 105, wagering game machines 161, walkways 117, and any other thing, item, device, etc. within the range of the monitoring devices), as well as any sounds or signals emitting from the casino floor objects. The monitoring devices can include any accompanying devices, instruments, or machinery used to record and/or transmit the detected images, sounds, or other signals, such as video and sound recording devices, signal processing devices, etc.

A monitoring server 180 can control all monitoring activities and present perceptible "captured data" (e.g., captured images, captured sounds, etc.) of the casino floor objects on various devices for review. For instance, the monitoring server 180 can present the captured data of the casino floor as a video casino floor map 123 on a display 120 of a mobile device 160, connected via a communications network 122. A casino administrator and/or patron can carry the mobile device 160 around a casino. In some embodiments, the monitoring server 180 can present the captured data on other devices, such as on a computer monitor, on a cell phone, on head phones or speakers, or any other device that can present audio and visual information. In some embodiments, the monitoring server 180 can present the captured data in a true-to-life format, such as by transmitting a live video feed of the casino floor to the mobile device 160. The monitoring server 180 can track the movement of the mobile device 160 as a player carries it around the casino and can present the casino from the player's perspective. For example, the monitoring server 180 may detect the direction that the mobile device 160 is pointing and present the video feed of the casino floor from that direction.

The monitoring server 180 can collect data (e.g., player identity data, machine results, machine identifiers, descriptive information, etc.) related to the captured objects from data sources associated with the captured objects. The monitoring server 180 can also calculate data (e.g., helps or tips, pop-up displays, motion directors, traffic analysis, facial recognition results, etc.) related to the captured objects. The collected and/or calculated data can be collectively referred to as metadata, indicating data that is related to the perceptible captured data. The monitoring server 180 can then merge the metadata with the captured data and present a data mash-up on the video casino floor map 123 showing both captured objects and metadata. For example, the monitoring server 180 can generate overlay objects ("overlay objects") (e.g., image hotspots, overlay images, pop-up displays, etc.) and superimpose the overlay objects onto the video casino floor map 123 to indicate locations where metadata can be viewed and/or the metadata related to the casino floor objects. In one embodiment, the mobile device 160 includes a display 120 that shows a real-time video feed overlaid onto a computerized casino floor grid (or vice-versa a computerized grid overlaid onto the real-time video feed). The casino floor grid is hidden from view, and is a framework onto which the monitoring server 180 can impose the video feed. The video feed can display any or all of the same objects that are actually on the casino floor. In some embodiments, the monitoring server 180 can focus on some objects more than others, omit objects, manipulate object appearances, etc. In some embodiments, the monitoring server 180 can insert dynamic images 126, 125 into the floor map 123. Dynamic images 123 may be identifiable by graphical indicia, such as dotted borders, darkened lines, etc. The dynamic images 126, 125 can indicate a selectable portion of the video casino floor map 123 that can present collected, calculated, and/or enhanced perceptible captured data. For example, a player can select (e.g., touch) the dynamic image 126 on a display screen for the wagering game machine object 161. The monitoring server 180 can detect the selection of the dynamic image 126 of the wagering game machine object 161 and react by, for example, presenting a blow-up display 129 which zooms in on a screen for the wagering game machine object 161. The blow-up display 129 shows the state of the wagering game, any information about the wagering game or the wagering game machine (e.g., game history, account information, errors, repair needs), etc. Likewise, the dynamic image 125 can indicate another selectable section of the video casino floor map 123, such as by presenting a glow, a sparkle, or other highlight effect. The dynamic image 125 partially conforms to the shape of part of an image on the video casino floor map 123, although the overlay object 125 could be any shape (e.g., a rectangle, an oval, etc.), as long as it highlights the selectable section of the video casino floor map 123. The mobile device 160 can detect when a player selects the dynamic image 125, and react by presenting metadata, such as showing a detailed image 130 of the video feed in another blow-up display 128.

Although FIG. 1 describes some embodiments, the following sections describe many other features and embodiments.

Example Operating Environments

This section describes example operating environments and networks and presents structural aspects of some embodiments. More specifically, this section includes discussion about casino monitoring systems and casino monitoring system architectures.

Generating a Virtual Casino Floor Map

Figure 2:
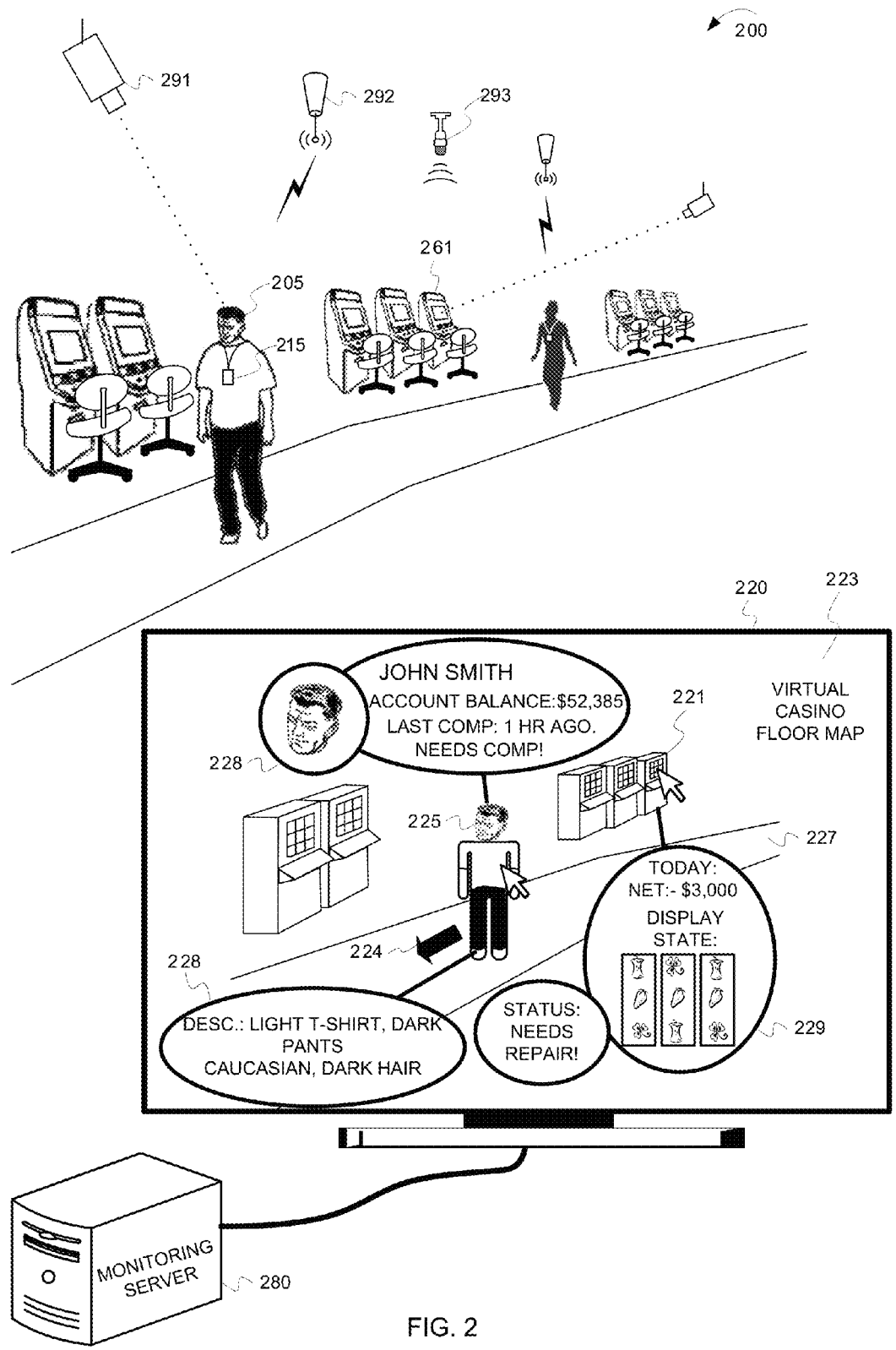
FIG. 2 is an illustration of generating a virtual casino floor map 223, according to some embodiments.

FIG. 2 is a conceptual diagram that illustrates an example of generating a virtual casino floor map, according to some embodiments. In FIG. 2, the casino monitoring system 200 includes monitoring devices similar to those described in FIG. 1, such as video cameras 291, radio signal detectors 292, microphones 293, etc. The casino monitoring system 200 also includes a monitoring server 280. In some embodiments, the monitoring server 280 can process captured data to generate three-dimensional objects, textures, topology, etc. In other words, the monitoring server 280 can generate a "virtual" casino floor map 223 of the real-life casino floor. The casino monitoring system 200 can present a rendering of the virtual casino floor map 223 on a monitor 220, or other such presentation device. The monitoring server 280 can generate virtualized objects of the casino floor objects, such one or more virtual wagering game machine objects 221, which represent actual wagering game machines 261; virtual walkways 227; virtual characters 225, which represent actual casino patrons and/or staff; etc.

The monitoring server 280 can also present selectable and/or dynamic overlay objects, like in FIG. 1, which causes pop-up displays 228, 229 to appear with information related to any of the virtual objects. The information can come from a variety of sources, such as account servers, security servers, radio-frequency identification cards 215 carried by a patron 204 or staff member in the casino, etc. The monitoring server 280 can present movement indicators, such as the arrow icon 224 showing the direction of movement of a virtual character 225. The virtual character 225 can also move within the virtual casino floor map 223 in a way that matches the movements of the actual patron 205. The monitoring server 280 can generate and apply textures on the 3-D skeleton of the virtual character 225, or the virtual machines 221, that match the appearance and characteristics of the patron 205 or machine 261, such as the patron's face, clothing, etc. and the machine's body, screen, etc. The monitoring server 280 can also omit some of the objects on the casino floor, such as chairs, people, machines, or other objects, which can help a player to see, and focus on, specific types or categories of casino floor objects.

Casino Monitoring System Architecture

Figure 3:
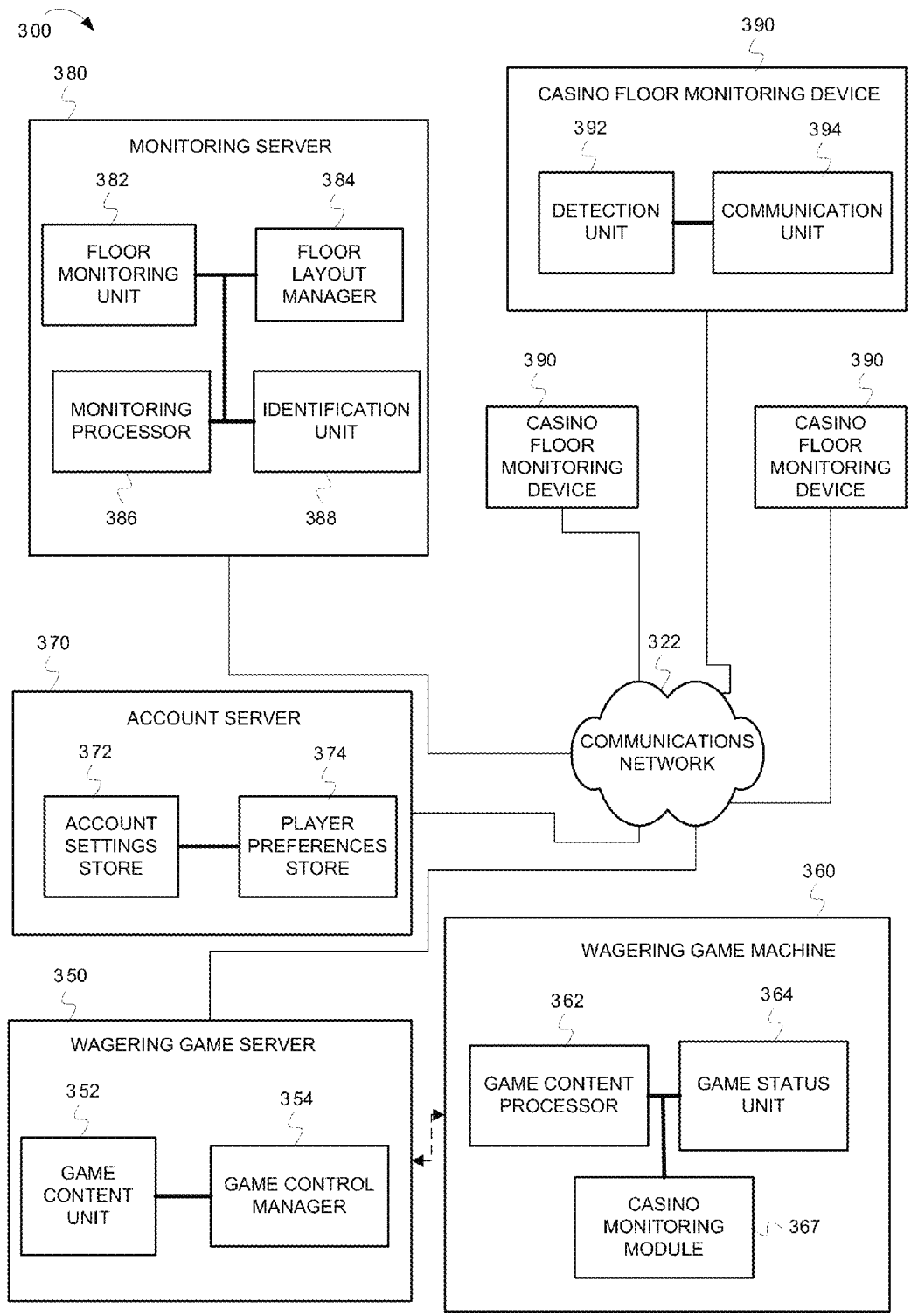
FIG. 3 is an illustration of a casino monitoring system architecture 300, according to some embodiments.

FIG. 3 is a conceptual diagram that illustrates an example of a casino monitoring system architecture 300, according to some embodiments. The casino monitoring system architecture 300 can include at least one casino floor monitoring device 390 configured to monitor casino floor objects. The casino floor monitoring device 390 can include a detection unit 392 configured to detect and/or record imagery, sounds, heat, weight, light, motion, and any other characteristic possessed by, or signal generated by, casino objects and devices. The casino floor monitoring device 390 also can include a communication unit 394 configured to transmit and receive signals that convey identifying information about casino floor objects and devices.

The casino monitoring system architecture 300 also can include a monitoring server 380 configured to process data to generate a casino floor map. The monitoring server 380 can include a floor monitoring unit 382 configured to track floor monitoring activities, receive and store captured data, and receive and store calculated data. The monitoring server 380 also can include a floor layout manager 384 configured to generate a computerized grid of the casino floor layout having the identity of casino objects. The floor layout manager 384 can generate the grid from provisioning data entered by a casino manager, electronic inspection of the captured data, or other suitable information. The monitoring server 380 also can include a monitoring processor 386 configured to overlay video imagery onto the computerized grid of the casino floor layout to generate video casino floor maps. The monitoring processor 386 can also generate overlay objects (e.g., image overlays, image hotspots, pop-ups, etc.). The monitoring processor 386 can superimpose the overlay objects over a generated video casino floor map. The monitoring processor 386 can also generate virtual objects from real-life casino objects. The monitoring processor 386 can also generate a virtual casino floor map of the real-life casino floor and control the rendering, texturing, positioning, actions, and appearances of the virtual objects on the virtual casino floor maps.

The monitoring server 380 also can include an identification unit 388 configured to detect identifying information from wagering game machines, patron ID cards, locator devices, monitoring devices, and any other object in a casino with identifying information that can be tracked electronically. The identification unit 388 can also communicate with external data sources, such as account servers, security databases, law-enforcement databases, physical facilities servers, patron services servers and databases, etc. The identification unit 388 can also perform facial recognition, behavioral recognition, appearance detection, and other forms of identifying operations by analyzing captured data.

The casino monitoring system architecture 300 also can include an account server 370 configured to control player related accounts accessible via wagering game networks and social networks. The account server 370 can store and track player information, such as identifying information (e.g., avatars, screen name, account identification numbers, etc.) or other information like financial account information, social contact information, etc. The account server 370 can contain accounts for social contacts referenced by the player account. The account server 370 can include an account settings store 372 configured to store information about settings for a player's account. The account server 370 also can include a player preferences store 374 configured to store preferences information about a player's account.

The casino monitoring system architecture 300 also can include a wagering game server 350 configured to control wagering game content and communicate wagering game information, account information, and casino monitoring information to and from a wagering game machine 360. The wagering game server 350 can include a game content unit 352 configured to generate and/or contain content related to wagering games. The wagering game server 350 also can include a game control manager 354 configured to control processing and use of wagering game content. The wagering game server 350 can also transmit and receive game results; generate random numbers; track and/or generate game meters, outcomes, and win percentages; transmit and receive information to/from external data sources and devices, and perform any other operations related to wagering games and other casino related activities.

The casino monitoring system architecture 300 also can include a wagering game machine 360 configured to present wagering games and receive and transmit information to present casino floor maps. Although FIG. 3 shows only one wagering game machine 360, the architecture 300 can support large numbers of wagering game machines. The wagering game machine 360 can include a game content processor 362 configured to contain content, related to wagering games, to present on the wagering game machine 360. The wagering game machine 360 can also process and control the use of wagering games and other applications and/or modes on the wagering game machine 360. The wagering game machine 360 also can include a game status unit 364 configured to track the status of the wagering game machine, check for software and hardware errors, check winning percentages, gather game history information and/or account information stored on, or in conjunction with, the wagering game machine, and transmit game state information to the monitoring server 380 and/or wagering game server 350. Further, the wagering game machine 360 can include a casino monitoring module 367 configured to process communications, commands, or other information, where the processing can generate casino floor maps. The casino monitoring module 367 can perform any of the functions that the monitoring server 380 can perform regarding generating casino floor maps, and/or process data and control information provided by the monitoring server 380.

Each component shown in the casino monitoring system architecture 300 is shown as a separate and distinct element. However, some functions performed by one component could be performed by other components. For example, the monitoring processor 386 could determine, generate, or otherwise control computerized grids of casino floor layouts, metadata, recorded data, etc. Furthermore, the components shown may all be contained in one device, but some, or all, may be included in, or performed by multiple devices on the systems and networks 322, as in the configurations shown in FIG. 3 or other configurations not shown. Furthermore, the casino monitoring system architecture 300 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 4:
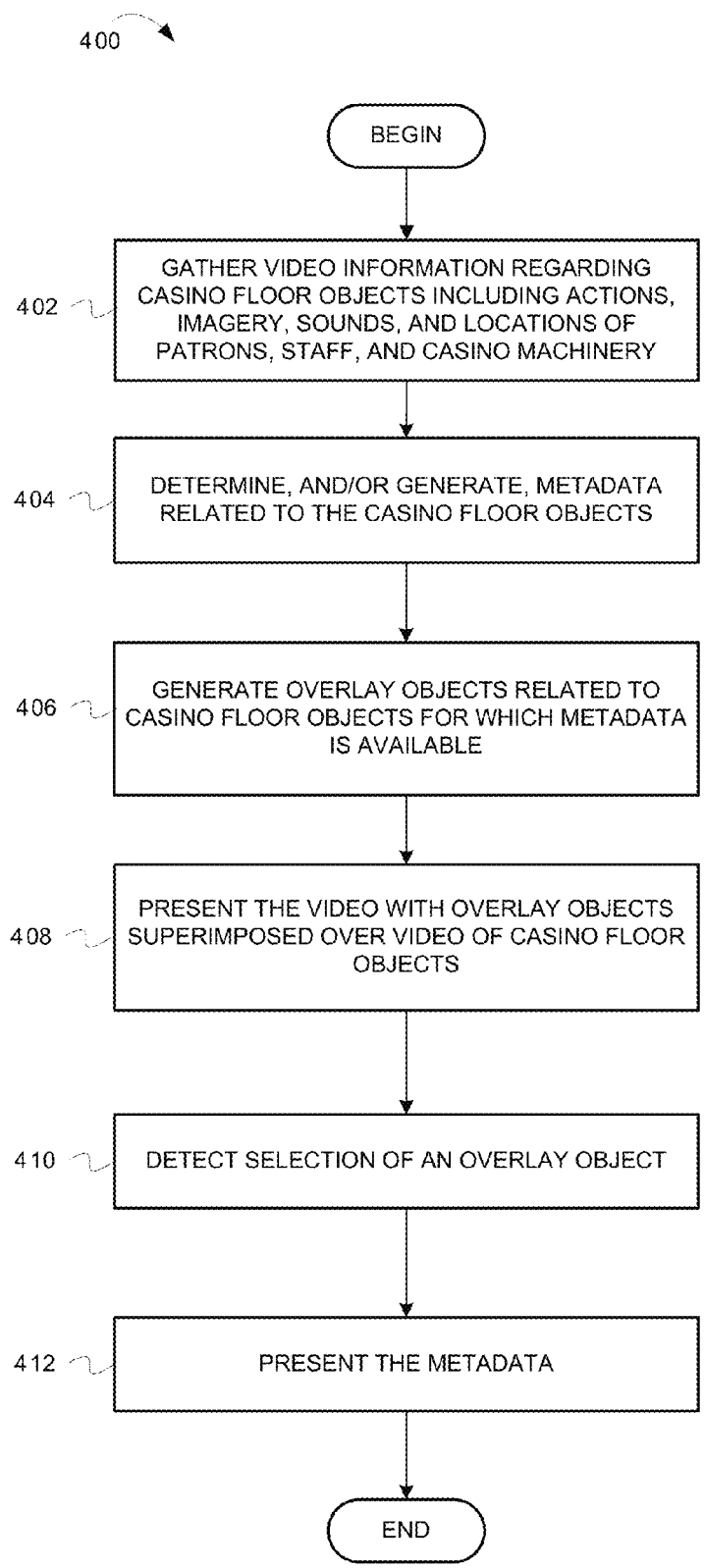
FIG. 4 is a flow diagram 400 illustrating generating a real-time video casino floor map, according to some embodiments.

FIG. 4 is a flow diagram illustrating generating a real-time video casino floor map, according to some embodiments. In FIG. 4, the flow 400 begins at processing block 402, where a casino monitoring system ("system") gathers video information regarding casino floor objects including actions, imagery, sounds, and locations of patrons, staff, and/or casino machinery. Video information can include filming the interior of the casino with video cameras. In some embodiments, the video cameras can be video cameras able to capture video in sufficient resolution to distinguish between different objects, activities, facial characteristics, clothing types, color contrasts, etc.

The flow 400 continues at processing block 404, where the system determines and/or generates, metadata related to the casino floor objects. The casino monitoring system can determine metadata by detecting the identity of an object and collecting any metadata associated with the object, such as metadata that relates to the object's identity, status or history.

The flow 400 continues at processing block 406, where the system generates overlay objects related to the casino floor objects for which metadata is available. For example, in FIG. 1, the system 100 generated dynamic images 126, 125 (e.g., hotspots) which indicated that metadata was available to be viewed.

The flow 400 continues at processing block 408, where the system presents the overlay objects superimposed over the video feed. For example, the system can generate a computerized grid of the casino's floor layout and overlay the video feed over the computerized grid. The computerized grid may contain spatial coordinates for casino objects (e.g., landmarks, machinery, etc.). The casino floor objects may appear on the spatial grid as computerized object identifiers. The computerized object identifiers exist on the grid and identify the location of the casino floor objects in relation to the spatial coordinates. The system also knows the locations of the monitoring devices, and therefore can determine where captured imagery exists in relation to the spatial coordinates on the computerized grid. As a result, the monitoring server can superimpose the video feed over the grid so that the video images of casino objects overlay with the computerized, but undisplayed, object identifiers. The system can generate one or more clear layers, and superimpose the clear layer over the video feed. The system can then superimpose the overlay objects onto the clear layer, giving the appearance of a video feed with overlay objects on top of casino floor objects. The result may look like the display 120 in FIG. 1, which shows a video casino floor map 123 of the casino floor 117 with one or more overlay objects (e.g., dynamic images 125, 126 and pop-up displays 128, 129) presented on top of a live video feed.

The flow 400 continues at processing block 410, where the system detects a selection of an overlay object. The overlay object can be selected by touch, mouse click, etc.

The flow 400 continues at processing block 412, where the system presents the metadata. The system can present the metadata in other overlay objects, like a pop-up display, a side-bar display, a roll-over image, a sound file, and/or any other method of presenting metadata. For example, in FIG. 1, the system 100 presents the metadata inside of pop-up displays 128, 129 on the same display 120 as the video feed. In some embodiments, the system can present the metadata on peripheral devices, such as side-monitors, docking stations, kiosks, network monitors, etc.

Figure 5:
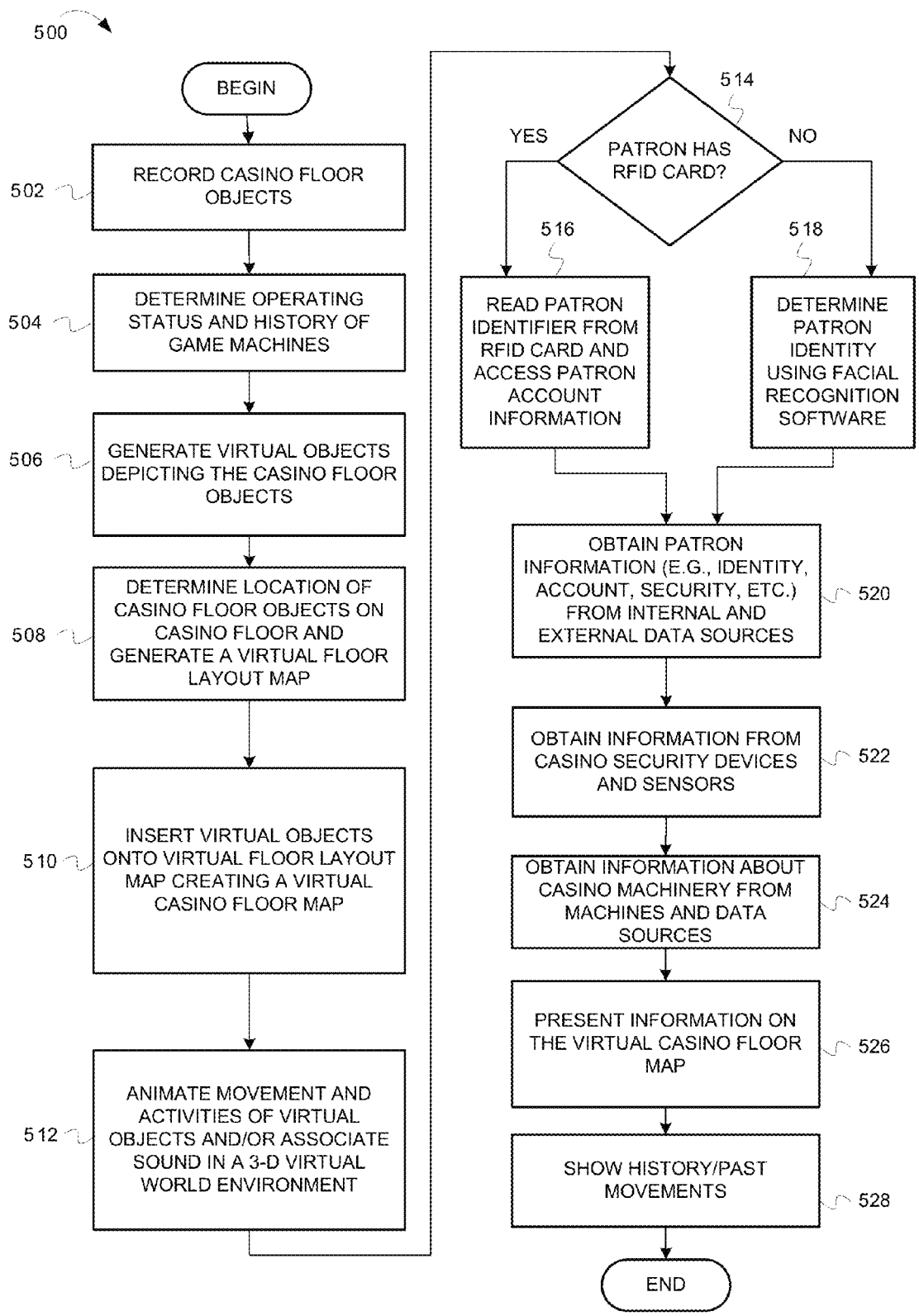
FIG. 5 is a flow diagram 500 illustrating generating a virtual casino floor map, according to some embodiments.

FIG. 5 is a flow diagram illustrating generating a virtual casino floor map, according to some embodiments. In FIG. 5, the flow 500 begins at processing block 502, where a system records information (e.g., casino imagery, object characteristics, patron movements, transactions, etc.) of casino patron, machinery, and other physical objects. FIGS. 1 and 4 describe examples of recording information.

The flow 500 continues at processing block 504, where the system determines the operating status and history of wagering game machines. The system can determine the operating status of a wagering game machine, or any other machine (e.g., coin machines, vending machines, monitoring equipment, etc.) by communicating with the machine via a communications network. The machines can have RFID chips, network connectors and cards, or other components that can communicate status information via the network. The system can obtain game history by reading any historical data about the machines operations from memory cards on the machines. The system can also query network devices, like wagering game servers, account servers, etc., that store historical information about wagering games results, transactions and/or activities. The system can also video record the display screens of the machines and determine the status of the machines by analyzing the information presented on the display screens.

The flow 500 continues at processing block 506, where the system generates virtual objects depicting the casino floor objects. The system can create geometric shapes, convert video and images into textures and overlay textures on virtual objects to conform to a geometric skeleton. The system can utilize avatars and pre-selected icons and images, not necessarily what is captured on video within the casino, in conjunction with the virtual object. For example, a friend's avatar may be used as the texture on the object.

The flow 500 continues at processing block 508, where the system determines the location of the casino floor objects on the casino floor and generates a virtual floor layout map. The system can determine the location of the objects in relation to their position on the casino floor. For example, the system can determine the location of a monitoring device and extrapolate the location of the object by calculating an approximate distance from the monitoring device. For instance, the system knows the landscape of the casino floor and can generate a computerized layout with approximate coordinates for the floor layout. The system knows, or can determine, the location of a video camera within the computerized layout. The system can determine the current position of a camera lens, and an angle of direction for the video footage. Using that information, the system can approximate a distance of the object from the camera. The system can then determine a location for the object within the geographic landscape of the casino floor. In another example, an object may contain components that indicate its location within the casino. The system can determine the location using locator systems, such as global positioning satellite systems, RFID locator systems, etc.]

The flow 500 continues at processing block 510, where the system inserts the virtual objects onto a virtual floor layout map creating a virtual casino floor map. The system can generate a virtual floor layout map ("virtual map"), representing the casino floor's landscape. The system can provide textures to the virtual map, such as by adding carpet textures to floors, paint textures to walls, metal textures to machines, etc. The system can then position the virtual objects within the virtual map according to their location determined at processing block 508.

The flow 500 continues at processing block 512, where the system animates the movement and activities of the virtual objects on the virtual map. The system can also associate sound with the virtual objects and present recorded audio of any sounds made by the casino floor objects depicted as virtual objects. In some embodiments, the system can render the virtual objects on the wagering game machine or render the virtual objects using a rendering server. When using a rendering server, the wagering game machine can send messages to the rendering server to render certain objects and present the rendered objects in a three-dimensional animation on the wagering game machine. The rendering server can run a rendering process on the rendering server whereas the wagering game machine can run other wagering game related processes on the wagering game machine. In some embodiments, though, the wagering game machine can render the animation on the wagering game machine, using the same process for running a wagering game, but using different threads (e.g., one thread for rendering content and one or more threads for computing wagering game functions). Consequently, the system can utilize the same machine to render and process games and utilize the same memory device on the same machine. Further, the wagering game machine can utilize proxy objects. More specifically, the client can create an object, and the rendering server can create the same object. However, the wagering game machine uses the object on the wagering game machine as a proxy and can animate the object on the wagering game machine and/or send messages to the rendering server to animate the object.

The flow 500 continues at processing block 514, where the system determines whether a patron is carrying a radio-frequency identification (RFID) card. If so, at processing block 518, the system can read a patron identifier from the RFID card and access the patron's account information from a patron account. If the patron is not carrying an RFID card, or other similar identifier device, the system can still determine the identity of the patron. For example, at processing block 520, the system can utilize facial recognition software and compare the facial characteristics of the patron to a database of know people. Regardless, even if the system cannot identify the patron by name, it can still generate information about the patron that can be used later, such as determining the general description of the patron (e.g., what clothing the patron is wearing, the approximate height and/or weight, eye color, skin color, etc.)

The flow 500 continues at processing block 520, where the system obtains patron information (e.g., identity, account, security, etc.) from internal and external data sources. The system can obtain patron information from servers, databases, or other sources of information within the casino, and outside of the casino. For example, the system can access a patron's casino account, which can indicate a patron's name, account balances, recent player activity, social contact information, transaction history, etc. The system can also access outside databases, such as available law enforcement databases, shared database between casinos, commercial databases, etc. The system can also provide the information obtained from the monitoring devices to any of these data sources.

The flow 500 continues at processing block 522, where the system obtains information from casino security devices and sensors. The system can access information from security devices and sensors, such as whether doors are open, whether alarms have been triggered, etc. The system can track information such as the location of dealers and other staff, when they last checked in, etc. The system can gather information from floor sensors, light sensors, heat sensors, or any other sensing device used for monitoring the casino premises.

The flow 500 continues at processing block 524, where the system obtains information about casino machinery from machines and data sources. The system can obtain information directly from machines and/or servers.

Figure 7:
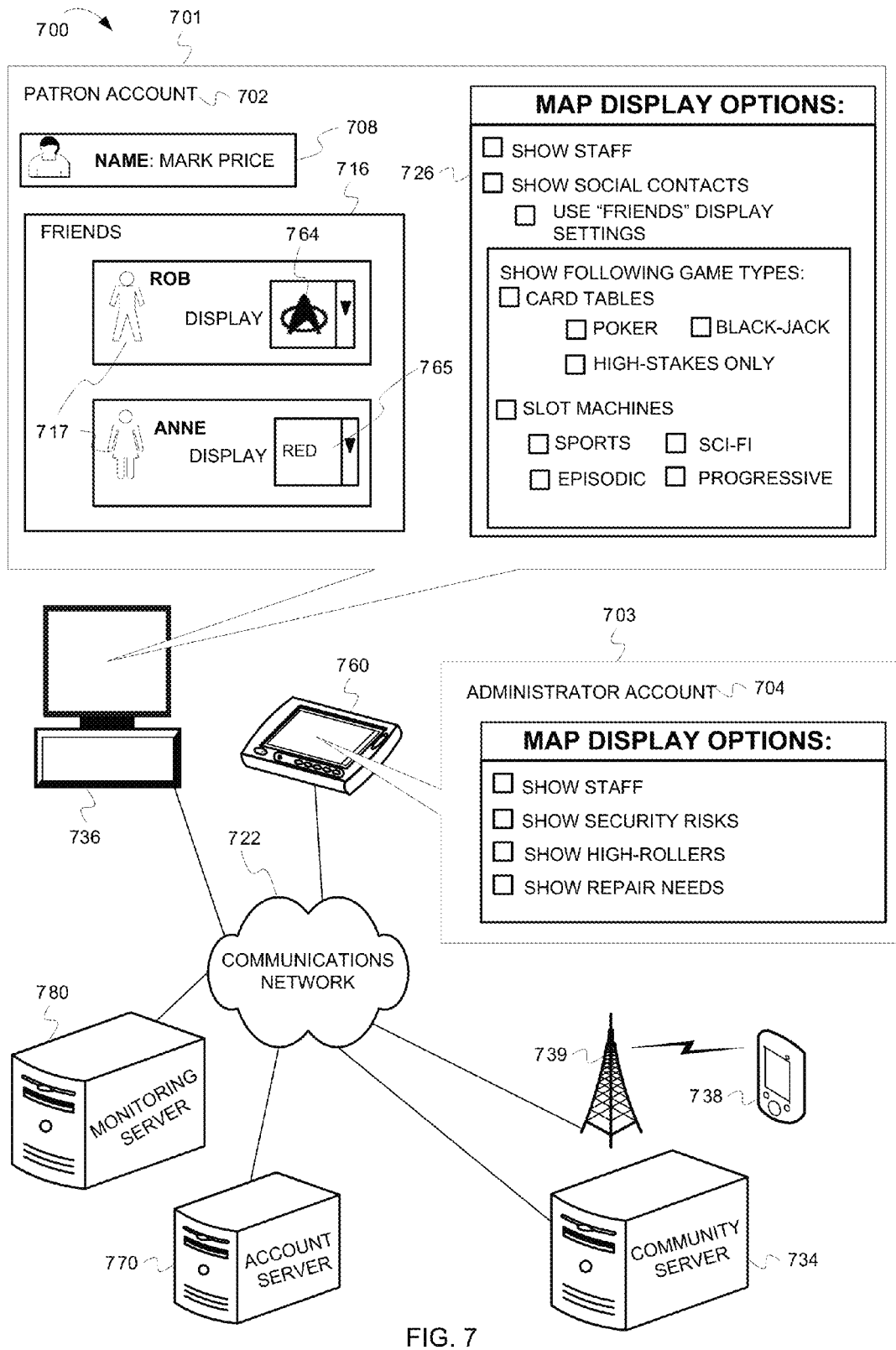
FIG. 7 is an illustration of an account based casino monitoring system 700, according to some embodiments.

The flow 500 continues at processing block 526, where the system presents related information ("metadata") on the virtual map. The system can take all of the metadata and present it within the virtual map. The system can present the metadata at the request of a player, such as when a player selects an object within the virtual map. The system can also determine player profiles or settings that indicate how and when to present metadata. FIG. 7 describes this in more detail.

The flow 500 continues at processing block 528, where the system shows the history and/or past movements of casino floor objects. The system can utilize the metadata to track the history of activities and movements of machines, patron, staff and any other casino floor objects. For example, the system can track and analyze the traffic flow over time for certain sections of the casino floor. The system can use the traffic flow analysis to determine floor lighting patterns, machine back-lighting reduction, security enhancement techniques, staff working schedules, fire hazard risks, patron dispute resolutions, etc. The system can show the past history of the activity on the virtual casino floor map for any requested time frame.

Additional Example Embodiments

According to some embodiments, a casino monitoring system can provide various example devices, operations, etc., to generate casino floor maps. The following non-exhaustive list enumerates some possible embodiments.

- The system can focus on a single area of the casino floor at a time or display a select few areas of the casino floor at the same time.
- The system can take still shots of the casino and present pictures in addition to, or instead of, video.
- The system can take images of what is around a person, for example, a person's purse or backpack, a coat, a drink, etc.
- The system can illustrate drinks, money, etc. moving around on a casino floor map.
- The system can reach across different properties or casinos, so that a casino staff member doesn't have to go to the actual locations, but can view all of the properties from one location.
- The system can have machine recognition of problems on the casino floor, (e.g., can automatically detect items that are out-of place, spills on a carpet, etc.).
- The system can include cameras that are attached to machines to view the machine's display screen.
- The system can present a view of the casino floor from the web (e.g., to view a social contact within in the casino, to replay a jackpot win, etc.).
- The system can show the casino imagery based on time of day, after a specific event, etc.
- The system can link to a security system to coordinate the movements and activities on the casino floor and to index time related information (e.g., track time stamps, RFID #s, etc.).

The system can track the traffic flow and/or patron count in an area and automatically reduce or increase backlighting on machines or on overhead lighting. Similarly, the system can track when a person gets close to a machine or an area, and then increase the lighting.

The system can track when a patron has hit a jackpot and then track the movement of the patron. The system can display physical characteristics of the patron so that a casino staff member (e.g., a casino pit boss) could use a mobile device to track down the patron, based on the patron's characteristics, and offer to assist the patron with security or present the patron with comps, publicity, etc.

Additional Example Operating Environments

This section describes example operating environments, systems and networks, and presents structural aspects of some embodiments.

Example of Additional Casino Floor Map Utilities

Figure 6:
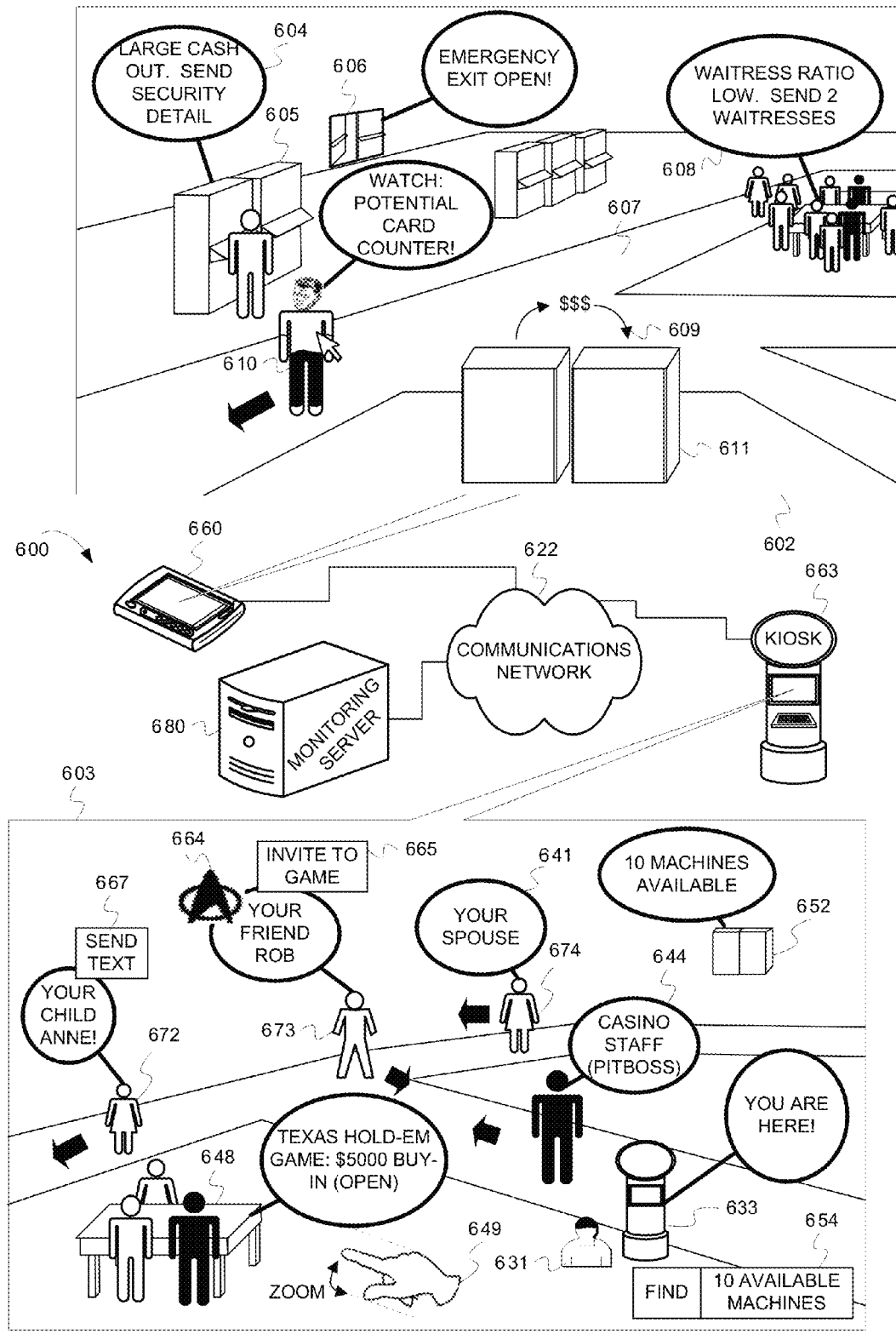
FIG. 6 is an illustration of additional casino floor map utilities, according to some embodiments.

FIG. 6 is a conceptual diagram that illustrates an example of additional casino floor map utilities, according to some embodiments. In FIG. 6, the system 600 includes a monitoring server 680 connected to a communications network 622. A mobile device 660 and a kiosk 663 are also connected to the communications network 622. The mobile device 660 presents a display 602 showing several embodiments as potentially utilized by a casino administrator or staff member. The kiosk 663 presents a display 603 showing several embodiments as potentially utilized by a casino patron. The mobile device 602 and kiosk 663 can present a real-time video casino floor map, a virtual world casino floor map, or any other variation of real-life imagery and modified imagery.

The mobile device 660, in conjunction with the monitoring server 680, can present an image (modified or true-to-life) of the casino floor showing casino objects, such as patrons 610, machines 605, 611, walk-ways 607, doors 606, or other real-life objects. The mobile device 660 can also present overlay objects 604, 608, 609. The overlay objects 604, 608, 609 can present metadata, about the objects 610, 606, 611, 607. The mobile device 660 can present an image of the casino floor that shows information relevant to a specific role, or combination of roles, for casino staff, such as a technician, guard, pit boss, waitress, inspector, etc. For example, the following list describes some exemplary embodiments that the mobile device 660 can present for a casino staff member:

The mobile device 660 can indicate when a large amount of money has been cashed out and suggest (e.g., via overlay object 604) a need for a security guard to escort the patron to a casino teller.

The mobile device 660 can indicate when a casino patron has been identified as a potential rule-breaker or miscreant, a high-roller or special guest, a jack-pot winner, etc.

The mobile device 660 can indicate a security hazard, such as whether an emergency exit is open, an alarm is tripped, a room has exceeded an occupation limit, etc.

The mobile device 660 can indicate when funds are being used on a machine or are being transferred between machines (e.g., via overlay object 609).

The mobile device 660 can indicate where a waitress or attendant is needed to provide casino services (e.g., via overlay object 608).

The casino staff member can log in to the mobile device 660 and access a player account, such as the administrator account 704 in FIG. 7. The administrator account 704 can have stored settings for the casino administrator which the mobile device 660 can use to present relevant information in certain ways.

The kiosk 663 can present an image of the casino floor that shows information relevant to a patron. The patron can log in to the kiosk 663 and access a player account, such as the patron account 702 in FIG. 7. The following list describes some exemplary embodiments that the kiosk 663 can present for a casino patron:

The kiosk 663 can indicate the location of a social contact (e.g. a friend 673 or family member 672, 673) on the casino floor. The social contact can carry RFID cards, or be identified by the system using other identification methods. The kiosk 663 can indicate the location of a pit boss, a waitress, a technician, or other casino staff.

The kiosk 663 can present a representation of the kiosk 633 within the display 603.

The kiosk 663 can present an avatar, or other identifying symbol, representing the current player (e.g., avatar 631), or a social contact (e.g., symbol 664).

The kiosk 663 can present pop-up boxes 667, 665, to send communications, such as text messages or invitations, to casino patrons or staff. The system 600 can send the communications to hand-held devices that the patrons or staff may be carrying, such as mobile devices, cell phones, etc. The system 600 can also send audio signals (e.g., phone calls, announcements, etc.) originated from the kiosk 663.

The kiosk 663 can indicate when a spot in a game is available, such as an opening 648 in a card game or tournament.

The kiosk 663 can also present a search field 654 to receive and process a search query. For example, the search query could be to find a bank of available machines, such as for a group of patrons to sit next to each other. The kiosk 663 processes the search and indicates a bank of machines 652 that are available.

The kiosk 663 can show stats, history, and other information about a game machine or bank of game machines (e.g., empty parts of the casino floor so that the patron can play games in seclusion, games that have hit jackpots recently, etc.)

The kiosk 663 can respond to a player's touch, as indicated by the floating hand 649. The hand 649 can follow a player's touch on a screen, or a touch pad, such as a mouse pad. The player can zoom into and out of a section of the display 603 by moving fingers together, tapping on the screen, or performing some other finger motion or stroke upon the screen or touch-pad.

Account-Based Casino Monitoring System

FIG. 7 is a conceptual diagram that illustrates an example of an account based casino monitoring system, according to some embodiments. In FIG. 7, a computer 736, a casino-based mobile machine 760, a monitoring server 780, an account server 770, a community server 734 and a personal mobile device, such as a personal digital assistant (PDA) 738 are connected to a communications network 722. The PDA 738, can be connected to the communications network 722 via a wireless transmission system 739. The computer 736 can present a player account display 701 for a player account 702. The player account display 701 presents a graphical player interface of the player account 702 stored on the account server 770. The graphical player interface can be generated and/or served, in part, by a community server 734, which can host one or more social network services and applications. The computer 736 can present player identity information 708. The computer 736 can present various settings 726 that represent a patron's preferences regarding a casino floor map. The settings 726 can indicate specific types of objects to be shown, focused on, omitted, highlighted, etc. on a casino floor map. The computer 736 can also present identifiers 717 for social contacts. The identifiers 717 can be avatars, icons, or other graphics, selected by the social contacts or the patron, to indicate how the social contact can be indicated on a casino floor map, or for other social networking services. The identifiers 717 can also include information regarding the social contacts, such as social contact names, one or more display symbols 764 or settings 764. The symbol 764 can be utilized to identify a specific friend or social contact within a casino floor map, such as the symbol 664 in FIG. 6. Similarly, the setting 765 can indicate a color to identify another social contact, such as the family member 672 in FIG. 6. The mobile machine 760 can access an administrator account 704 on the account server 770 for a casino administrator and present an administrator account display 704. The display 704 can indicate one or more settings for an administrator to select which can relate to what a system will present to a player, such as systems 100, 200, and/or 600.

Figure 10:
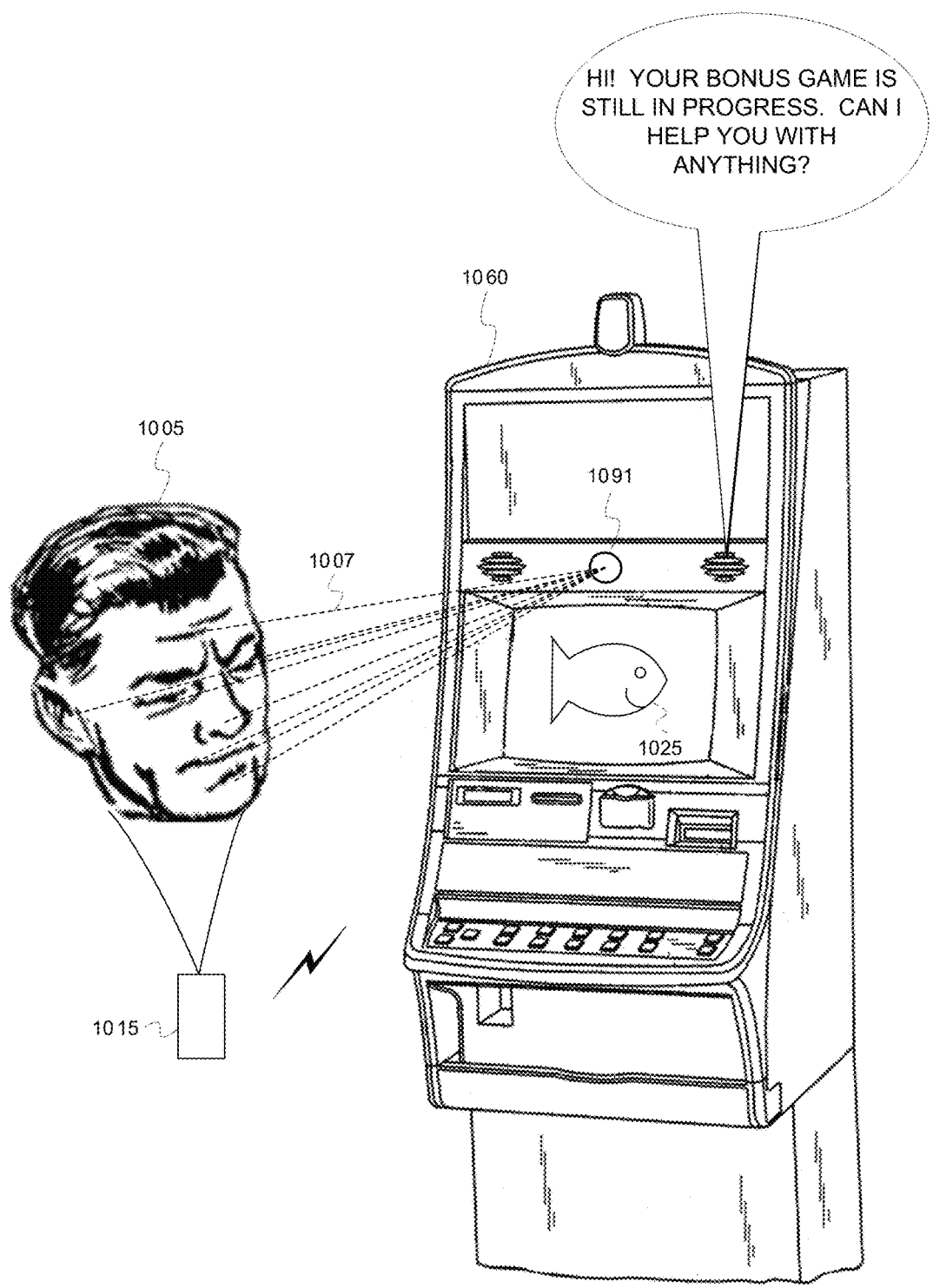
FIG. 10 is an illustration of a wagering game machine 1000, according to some embodiments.

In some embodiments, a wagering game machine, or other casino device, can include biometric sensors that can identify people and activity at close range, in high-detail. For example, FIG. 10 illustrates an example wagering game machine 1060 with an eye-level (i.e., front-facing) video camera ("video camera") 1091. The video camera 1091 is built into the wagering game machine 1060. It can detect fine details of a person's facial features, from an eye-level perspective, providing an advantage over security cameras that may be over-head or far away from people walking around a casino floor, sitting at wagering game machines, etc. The video camera 1091 can use the fine detail to determine a person's identity, their demeanor, their facial expressions, their mood, their activities, their eye focus, etc. The video camera 1091 can also detect objects in fine detail, such as name tags, identification pictures, name brands, drink levels, etc. The wagering game machine 1060 can also have other biometric sensors in addition to a video camera, such as a wireless card detector to detect identification information from a card 1015, a cell phone, a mobile wagering game machine, or other personal device, for a nearby casino patron or staff. The biometric sensors can also include sound detectors to detect voice patterns, spoken languages, spoken commands, etc. The biometric sensors can also include movement meters to measure a gait or stride that is unique to a person. The biometric sensors can detect colors (e.g., skin colors, eye colors, hair colors, clothing colors) and textures (e.g., clothing material, scars, etc.). The following list describes some exemplary embodiments for a wagering game system ("system") that utilizes close range bio-sensing devices, such as the wagering game machine 1060:

- The system can measure distances between facial features (e.g., distance between eyes, distance from eyes to nose, distance from nose to lips, length of lips, etc.). The system can compare the distances to recorded distances on a database to identify people. For instance, in FIG. 10, the eye-level video camera 1091 can record several reference points 1007 of a person's face. The system can measure distances between the reference points 1007 and generate an facial map. The system compares the facial map to records in a database for individuals that have previously been mapped. If no matching record is found, the system can store the measured data for future reference to track the individual anonymously. If a matching record is found, the system can identify the person and access account information, player history, or other information specific to the person.
- The system can analyze biometric information and use it as a verification for financial transactions (e.g., to verify a line of credit, to display an account total, to conduct a wager, etc.). The system can perform facial recognition in concert with a second form of biometric identification as an additional form of validation.
- The system can recognize a card or other personal identification badge with a biometric indicator (e.g., a fingerprint, a picture, a badge with a specific design, a barcode, a retina map, etc.).
- The system can present a gaming character or electronic valet that follows a person around the casino, displaying itself on devices equipped with biometric sensors. For instance, in FIG. 10, a fish character 1025 can appear on the screen of an inactive wagering game machine (e.g., on the wagering game machine 1060, when no-one is playing it). The wagering game machine 1060 (and/or other devices with biometric scanners), can identify specific individuals using biometric scans as they walk past the wagering game machine 1060. The fish character 1025 can appear in the wagering game machine 1060, or banks of wagering game machines or other devices, and follow the person as the person walks around the casino floor. The fish character 1025 can be in a likeness of a character associated with the person for a long-standing bonus game. The fish character 1025 can also act as an electronic valet that identifies when a person may need assistance (e.g., identifies when a person is looking around, identifies when a person looks lost, etc.). The electronic valet can recognize the player show information specific to the player (e.g., maps of the casino, account information, locations of items, etc.). A person can stop and face a machine and make a command. The valet can receive the command, via a microphone, and perform the command for person. The person can also request information, which the valet can display. The system can take the likeness of the electronic valet from a personal identifier for the player, such as an avatar stored in a player's account.
- The system can assist casino staff. For example, a service technician can stand in front of a bank of machines. The bank of machines can scan biometrics for the service technician and recognize the service technician as having an administrative status. An electronic valet can appear for the staff on the machine displays, and can give administrative functionality or options (e.g., provide diagnostic information, detect errors, fix machines, install software, report a spill, verify awards, etc.).
- The system can recognize facial expressions to control wagering games. The games can respond to facial expressions. For instance, the system can store an image of a person in a default, or normal state, (e.g., with relaxed, non-smiling facial features). During a wagering game session, the system can measure the change in facial features (e.g., can differentiate between a "happy" or "sad" state based on the distance between the edges of a mouth or lip position, the height of the eyebrows, etc.). The system can refer to a history a player's recent activities to analyze and determine the player's mood. For instance, the system can determine that a player has lost a run of games and thus estimate that a recorded image of player's facial features at that time, if different from the default facial feature image, indicates a sad (e.g., frustrated) mood. The system could then provide a free game or other perk (e.g., provide reward points, present a bonus game, present a friendly video clip, present a new game feature, etc.). The game could provide some form of help if a player cannot figure out how to play a game and looks frustrated. The system can also offer to change the reality of the games (e.g., offer to change the seat to a higher or lower position, offer to change the background of a game, offer to play specific theme music, etc.). The system can detect where eyes are looking to determine if a player may need help or if a player prefers a specific image or part of the game.

The system can recognize activities of a player in the foreground, or persons lurking in the background. For instance, the system can recognize a low drink level and send a waitress. The system might detect a background lurker and send a security guard. The system can also detect if a person is smoking illegally, is cold, is in a non-ideal seat position, etc.

The system can scan a picture of a person and find that person in a casino. Patrons and staff both can use this feature. For example, a casino patron way want to find a family member and shows a picture of the family member to a wagering game machine, a kiosk, or other casino device with up-close biometric scanning equipment. The casino device scans the picture and searches the casino, using the eye-level cameras, to find a match. In some embodiments a staff chief may want to find an employee (e.g., a waiter or waitress) and scans a picture of the employee. The system scans the picture and searches the casino using eye-level cameras or other biometric scanning devices. The system can then display a map of where the person is and how to reach that location.

The system can recognize a coupon when held up to a sensor on a machine (e.g., a kiosk, a mobile machine, etc.) and the person can redeem the coupon at the machine.

The system can determine when a person is looking at the machine for a long time and offer an incentive to play the machine (e.g., the machine can provide a free-spin for a player).

The system can detect a person that is participating in a tournament. The system can present tournament results to that person.

The system can detect persons that have won jackpots and provide congratulatory screens and images as the person walks around the casino or walks up to a machine.

The system can detect sounds at the game. For instance, if a player was speaking a specific language (e.g., Spanish), a machine could automatically change a wagering game display to that language, or make an offer to change the game to that language.

Example Wagering Game Machine Architecture

Figure 8:
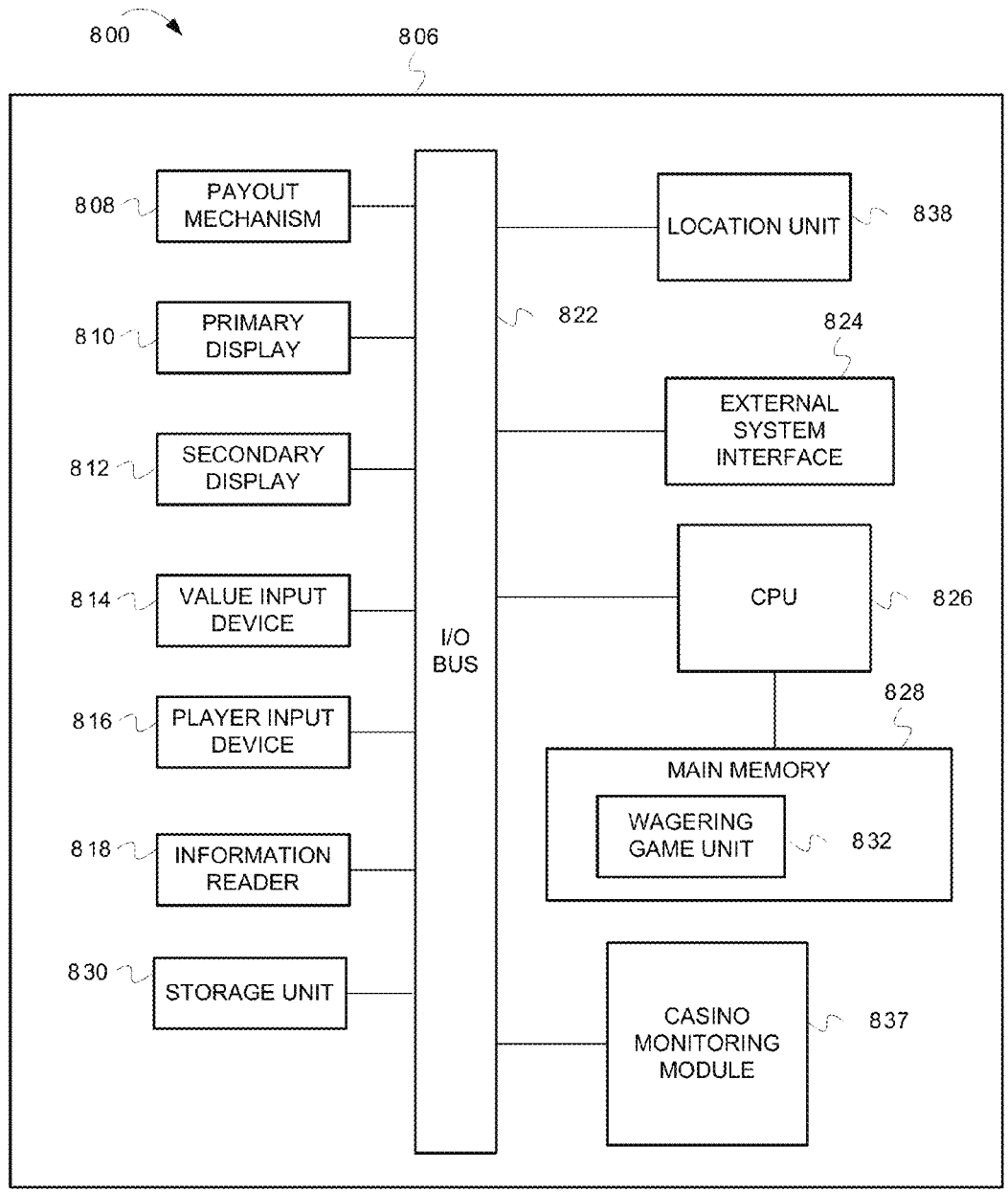
FIG. 8 is an illustration of a wagering game machine architecture 800, according to some embodiments.

FIG. 8 is a conceptual diagram that illustrates an example of a wagering game machine architecture 800, according to some embodiments. In FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game unit 832. In one embodiment, the wagering game unit 832 can present wagering games, such as video poker, video black jack, video slots, video lottery, reel slots, etc., in whole or part.

The CPU 826 is also connected to an input/output ("I/O") bus 822, which can include any suitable bus technologies, such as an AGTL+ frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems 804 (e.g., wagering game networks). The external system interface 824 can include logic for exchanging information over wired and wireless networks (e.g., 802.11g transceiver, Bluetooth transceiver, Ethernet transceiver, etc.)

The I/O bus 822 is also connected to a location unit 838. The location unit 838 can create player information that indicates the wagering game machine's location/movements in a casino. In some embodiments, the location unit 838 includes a global positioning system (GPS) receiver that can determine the wagering game machine's location using GPS satellites. In other embodiments, the location unit 838 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 8, in some embodiments, the location unit 838 is not connected to the I/O bus 822. In one embodiment, the wagering game machine 806 can include additional peripheral devices and/or more than one of each component shown in FIG. 8. For example, in one embodiment, the wagering game machine 806 can include multiple external system interfaces 824 and/or multiple CPUs 826. In one embodiment, any of the components can be integrated or subdivided.

In one embodiment, the wagering game machine 806 includes a casino monitoring module 837. The casino monitoring module 837 can process communications, commands, or other information, where the processing can generate casino floor maps. Furthermore, any component of the wagering game machine 806 can include hardware, firmware, and/or machine-readable media including instructions for performing the operations described herein.

Example Mobile Wagering Game Machine

Figure 9:
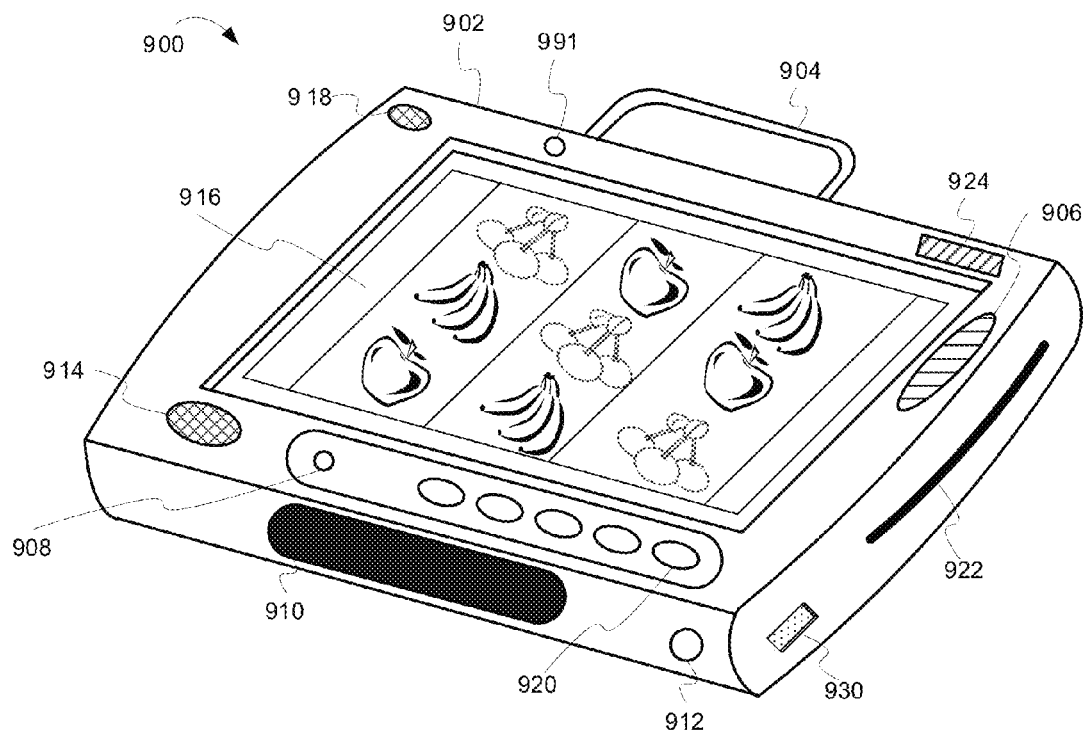
FIG. 9 is an illustration of a mobile wagering game machine 900, according to some embodiments.

FIG. 9 is a conceptual diagram that illustrates an example of a mobile wagering game machine 900, according to some embodiments. In FIG. 9, the mobile wagering game machine 900 includes a housing 902 for containing internal hardware and/or software such as that described above vis-à-vis FIG. 8. In one embodiment, the housing has a form factor similar to a tablet PC, while other embodiments have different form factors. For example, the mobile wagering game machine 900 can exhibit smaller form factors, similar to those associated with personal digital assistants. In one embodiment, a handle 904 is attached to the housing 902. Additionally, the housing can store a foldout stand 910, which can hold the mobile wagering game machine 900 upright or semi-upright on a table or other flat surface.

The mobile wagering game machine 900 includes several input/output devices. In particular, the mobile wagering game machine 900 includes buttons 920, audio jack 908, speaker 914, display 916, biometric device 906, wireless transmission devices 912 and 924, microphone 918, and card reader 922. In some embodiments, the biometric device 906, can be one or many types of biometrics scanners, such as a finger-print scanner, a retinal scanner, etc. The biometric device 906 can also scan images, such as a personal picture or personal identifying symbol or a bar-code on an identification card. The wagering game machine 900 can also include other biometric devices and sensors, such as a built-in video camera 991. The video camera 991 can scan a user's facial features and other characteristics as described in conjunction with FIG. 10. Additionally, the mobile wagering game machine can include tilt, orientation, ambient light, or other environmental sensors.

In one embodiment, the mobile wagering game machine 900 uses the biometric device 906 for authenticating players, whereas it uses the display 916 and speakers 914 for presenting wagering game results and other information (e.g., credits, progressive jackpots, etc.). The mobile wagering game machine 900 can also present audio through the audio jack 908 or through a wireless link such as Bluetooth.

In one embodiment, the wireless communication unit 912 can include infrared wireless communications technology for receiving wagering game content while docked in a wager gaming station. The wireless communication unit 924 can include an 802.11G transceiver for connecting to and exchanging information with wireless access points. The wireless communication unit 924 can include a Bluetooth transceiver for exchanging information with other Bluetooth enabled devices.

In one embodiment, the mobile wagering game machine 900 is constructed from damage resistant materials, such as polymer plastics. Portions of the mobile wagering game machine 900 can be constructed from non-porous plastics which exhibit antimicrobial qualities. Also, the mobile wagering game machine 900 can be liquid resistant for easy cleaning and sanitization. In some embodiments, the mobile wagering game machine 900 can also include an input/output ("I/O") port 930 for connecting directly to another device, such as to a peripheral device, a secondary mobile machine, etc. Furthermore, any component of the mobile wagering game machine 900 can include hardware, firmware, and/or machine-readable media including instructions for performing the operations described herein.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method of operating a gaming system, said method comprising:

sensing, by one or more electronic sensing devices of the gaming system, a physical area of a gaming environment, wherein the sensing the physical area comprises recording, by the one or more electronic sensing devices, one or more images of an individual within the physical area;

electronically analyzing, by at least one of one or more electronic processing units of the gaming system, electronic information obtained from the one or more electronic sensing devices in response to the sensing, wherein the electronic information is related to the physical area, and wherein the electronically analyzing the electronic information comprises analyzing, by at least one of the one or more electronic processing units, the one or more images against an image of a contact stored in the wagering game player account;

automatically determining, in response to the electronically analyzing, an identity of an individual located within the physical area, wherein the individual is indicated as the contact in a wagering game player account, and wherein the automatically determining the identity of the individual comprises, based on the analyzing, determining, by at least one of the one or more electronic processing units, that the identity of the individual is that of the contact stored in the wagering game player account;

presenting, by at least one of the one or more electronic processing units, a virtual identifier associated with the contact on an electronic display device in response to the automatically determining the identity of the individual within the physical area, wherein the electronic display device is associated with the wagering game player account;

detecting, by at least one of the one or more electronic processing units, a user input related to the virtual identifier presented on the electronic display device; and in response to the detecting the user input, automatically transmitting an electronic communication, via a network communication interface of the gaming system, to a device associated with the contact.

2. The method of claim 1, wherein the automatically determining the identity of the individual comprises:

monitoring, by the one or more electronic sensing devices, the individual within the physical area;

based on the monitoring, determining, via the electronically analyzing by at least one of the one or more electronic processing units, one or more unique characteristics of the individual;

comparing, by at least one of the one or more electronic processing units, the one or more unique characteristics to data for the contact stored in the wagering game player account, wherein the data is associated with the identity of the individual; and determining, by at least one of the one or more electronic processing units, the identity based on the comparing.

3. The method of claim 2, wherein the one or more unique characteristics comprise one or more of a fingerprint of the individual, a radio frequency identifier associated with the individual, a gait of the individual, a retinal image of the individual, and a voice pattern of the individual.

4. The method of claim 1, wherein the electronically analyzing the one or more images against the image of the contact stored in the wagering game player account comprises:

determining, by at least one of the one or more electronic processing units, one or more unique visual characteristics of the individual depicted in the one or more images; and determining, by at least one of the one or more electronic processing units, that the image of the contact includes the one or more unique visual characteristics.

5. The method of claim 1, wherein the presenting the virtual identifier associated with the contact on the electronic display device comprises:

generating, by at least one of the one or more electronic processing units, a virtual representation of the individual based on the identity of the individual; and presenting the virtual representation of the individual on a virtual representation of the physical area.

6. The method of claim 1, wherein the detecting the user input related to the virtual identifier presented on the electronic display device comprises:

automatically detecting, via an additional electronic communication received via the network communication interface, a selection of the virtual identifier via the electronic display device, wherein the virtual identifier indicates a feature to generate the electronic communication.

7. The method of claim 1, wherein the automatically transmitting the electronic communication to the device associated with the contact comprises:

detecting, from data stored in the wagering game player account related to the contact, a type of contact data for the device associated with the contact;

generating a communication associated with the type of contact data; and electronically transmitting, via the network communication interface, the communication associated with the type of contact data to the device associated with the contact using the type of contact data.

8. The method of claim 7, wherein the type of contact data comprises a telephone number for the device associated with the contact, wherein the generating the communication associated with the type of contact data comprises generating a text message, and wherein the transmitting the communication associated with the type of contact data to the device associated with the contact using the type of contact data comprises transmitting the text message to the telephone number.

9. The method of claim 1, wherein the device associated with the contact comprises one or more of a mobile wagering game machine associated with the individual, a cell phone associated with the individual, and a personal mobile device associated with the individual.

10. The method of claim 1, wherein the electronic communication comprises one or more of an invitation to participate in a wagering game and directions to a location in a casino.

11. One or more non-transitory, machine-readable storage media having instructions stored thereon, which when executed by a set of one or more processors of a gaming system cause the set of the one or more processors to perform operations for operating the gaming system, the instructions comprising:

instructions to sense, via one or more electronic sensing devices of the gaming system, a physical area of a gaming environment, wherein the instructions to sense the physical area include instructions record, by the one or more electronic sensing devices, one or more images of the individual within the physical area;

instructions to electronically analyze, by at least one of the one or more processors, electronic information obtained from the one or more electronic sensing devices in response to the sensing, wherein the electronic information is related to the physical area, and wherein the instructions to electronically analyze the electronic information includes instructions to analyze, by at least one of the one or more processors, the one or more images against an image of the contact stored in the wagering game player account;

instructions to automatically determine, in response to the electronically analyzing, an identity of an individual located within the physical area, wherein the individual is indicated as a contact in a wagering game player account, wherein the instructions to automatically determine the identity of the individual includes instructions to, based on the analysis, determine, by at least one of the one or more processors, that the identity of the individual is that of the contact stored in the wagering game player account;

instructions to presenting, by at least one of the one or more processors, a virtual identifier associated with the contact on an electronic display device in response to the automatically determination of the identity of the individual within the physical area, wherein the electronic display device is associated with the wagering game player account;

instructions to detecting, by at least one of the one or more processors, a user input related to the virtual identifier presented on the electronic display device; and instructions to in response to the detection of the user input, automatically transmit an electronic communication, via a network communication interface of the gaming system, to a device associated with the contact.

12. The one or more non-transitory, machine-readable storage media of claim 11, wherein the instructions to automatically determine the identity of the individual-includes operations comprising:
  instructions to monitor, by the one or more electronic sensing devices, the individual within the physical area;
  instructions to, based on the monitoring, determine, via the electronic analysis, by at least one of the one or more processors, one or more unique characteristics of the individual;
  instructions to compare, by at least one of the one or more processors, the one or more unique characteristics to data for the contact stored in the wagering game player account, wherein the data is associated with the identity of the individual; and
  instructions to determine, by at least one of the one or more processors, the identity based on the comparison.

13. The one or more non-transitory, machine-readable storage media of claim 12, wherein the one or more unique characteristics comprise one or more of a fingerprint of the individual, a radio frequency identifier associated with the individual, a gait of the individual, a retinal image of the individual, and a voice pattern of the individual.

14. The one or more non-transitory, machine-readable storage media of claim 13, wherein the instructions to analyze the one or more images against the image of the contact stored in the wagering game player account comprise:
  instructions to determine, by at least one of the one or more processors, one or more unique visual characteristics of the individual depicted in the one or more images; and
  instructions to determine, by at least one of the one or more processors, that the image of the contact includes the one or more unique visual characteristics.

15. A gaming system comprising:
  one or more electronic sensing devices;
  a network communication interface;
  one or more processors;
  an electronic display device; and
  one or more memory storage devices configured to store instructions, which when executed by at least one of the one or more processors cause the gaming system to perform operations to perform operations for controlling the gaming system, the instructions including,
    instructions to sense, by at least one of the one or more electronic sensing devices, a physical area of a gaming environment, wherein the instructions to sense include instructions to record, by the one or more electronic sensing devices, one or more images of the individual within the physical area;
    instructions to electronically analyze electronic information obtained from the at least one of the one or more electronic sensing devices in response to sensing the physical area, wherein the electronic information is related to the physical area, and wherein the instructions to analyze the electronic information include instructions to analyze, by at least one of the one or more processors, the one or more images against an image of a contact stored in a wagering game player account;
    instructions to automatically determine, based on electronic analysis of the electronic information, an identity of an individual located within the physical area, wherein the individual is indicated as the contact in the wagering game player account, wherein the instructions to automatically determine the identity of the individual includes instructions to, based on the analysis, determine, by at least one of the one or more processors, that the identity of the individual is that of the contact stored in the wagering game player account;
    instructions to present a virtual identifier associated with the contact on the electronic display device in response to the identity of the individual being automatically determined;
    instructions to detect a user input related to the virtual identifier presented on the electronic display device; and
    instructions to in response to the user input being detected, automatically transmit an electronic communication, via the network communication interface, to a device associated with the contact.

16. The gaming system of claim 15, wherein the instructions further comprise:
  instructions to detect, via an additional electronic communication received via the network communication interface, a selection of the virtual identifier via the electronic display device, wherein the virtual identifier indicates a feature to generate the electronic communication.

17. The gaming system of claim 15, wherein the instructions further comprise:
  instructions to automatically detect, from data stored in the wagering game player account about the contact, a type of contact data for the device associated with the contact; and
  instructions to generate a communication associated with the type of contact data.

18. The gaming system of claim 17, wherein the type of contact data comprises a device identifier for one or more of a mobile wagering game machine associated with the individual, a cell phone associated with the individual, and a personal mobile device associated with the individual, and wherein the one or more memory storage devices are configured to store instructions, which when executed by at least one of the one or more processors cause the gaming system to perform an operation to send a message using the device identifier.

19. The gaming system of claim 18, wherein the message specifies one or more of an invitation to participate in a wagering game associated with the wagering game player account and directions to a location in a casino for a bank of wagering game machines associated with the wagering game player account.

* * * * *